United States Patent [19]

Sugihara et al.

[11] Patent Number: 4,743,379

[45] Date of Patent: May 10, 1988

[54] FLOTATION DEVICE

[76] Inventors: Kazutoyo Sugihara, 964-38, Niihashi, Gotenba City; Yasuhide Kinoda, 2-3-16, Matsugaoka, Kugenuma, Fujisawa City, both of Japan

[21] Appl. No.: 881,594

[22] Filed: Jul. 3, 1986

[51] Int. Cl.$^4$ ............................................. B01D 21/01
[52] U.S. Cl. .................................... 210/705; 209/169; 209/170; 210/221.2
[58] Field of Search .................... 209/3, 4, 5, 7, 9, 12, 209/18, 162–167, 172.5, 173–178; 210/702–707, 198.1, 205–208, 221.1, 221.2

[56] References Cited

U.S. PATENT DOCUMENTS

| | | | |
|---|---|---|---|
| 4,049,553 | 9/1977 | Stebbins et al. | 210/221.2 |
| 4,564,457 | 1/1986 | Cairo et al. | 210/221.2 |
| 4,618,430 | 10/1986 | Favret et al. | 210/221.2 |

Primary Examiner—Frank Sever
Attorney, Agent, or Firm—Gifford, Groh, VanOphem, Sheridan, Sprinkle and Dolgorukov

[57] ABSTRACT

The instant invention comprises a method and apparatus for providing an alternative to chemical precipitation, electroplating and hydroxide floculation and for improving the separation of heavy metal from water.

19 Claims, 1 Drawing Sheet

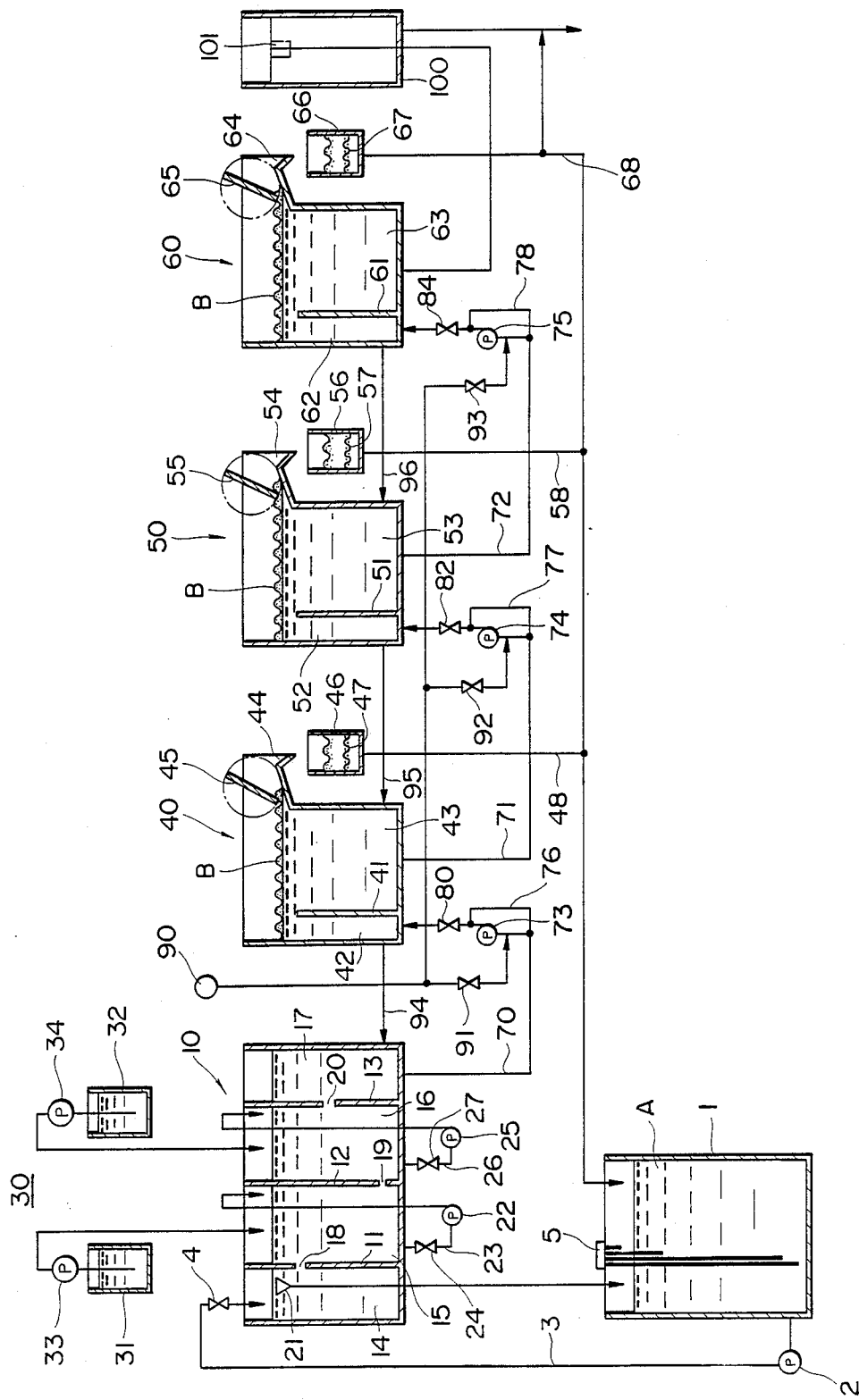

FLOTATION DEVICE

BACKGROUND OF THE INVENTION

The present invention relates to a flotation device to float and separate the dissolved, suspended, sedimental solids within a waste water liquid.

Conventionally, recovery of heavy metals dissolved in waste water using precipitation of heavy metal compounds using chemicals addition, the precipitation by is accomplished utilizing base metal of the ionization tendency, and electrolysis. However, precipitation using chemicals has some problems of fractionation because the produced precipitates have special characteristics, and furthermore it is difficult to recover and give a dehydration treatment to the precipitated sludge. And as for precipitation utilizing base metal of the ionization tendency, generally it is not only inconsistent with the recovery percentage and the quality of recovered sludge, but also the precipitation speed gradually drops and makes it difficult to obtain a high recovery percentage. Further, as for the electrolysis method, there is a limit in it because as the quality of the heavy metal deteriorates, the electric current efficiency decreases, so greatly that sufficient recovery is not obtained. Besides these techinical problems, they need larger equipments compared with their treatment ability which result in greater expenses, so that it was desired that the pertiment treatment methods would be developed. And as another way, there is a floating methods to float by adding the aluminume chloride and the iron chloride to the waste water liquid to form hydroxide, feeding air to the waste water liquid thus formed hydroxide, mixing them to generate minute air bubbles, and making these air bubbles adhere to the hydroxide. In this method, the flocs of hydroxide even if adhered to the air bubbles, the adherence condition between them is unstable and the efficiency of flotation is bad, and has a disadvantage that the flocs are destroyed causing how the air bubbles are generated, it is difficult to re-treat the water once conducted flotation treatment as they were.

SUMMARY OF THE INVENTION

It is, accordingly, an object of the present invention by, overcoming the above disadvantages, to provide the device of small and low cost that can separate efficiently the heavy metals contained in waste water liquid.

BRIEF DESCRIPTION OF THE DRAWING

The drawing is a schematic view of an embodiment of the present invention.

DETAILED DESCRIPTION OF THE INVENTION

In the drawing, 1 is a raw water tank storing the raw waste water liquid to be treated or the filtrate from the scum dehydration tank which will be described in later (both liquids are written as raw water), 2 is a pump to pump up the raw water within the raw water tank 1 to the conditional raw water tank 10, 3 is a pipe, 4 is a valve, 5 is a water level sensing element to transmit a signal for starting and stopping of the pump 2 sensing the liquid level of the raw water A within the raw water tank 1 or to transmit an alarm signal when the liquid level of the raw water A is too high.

10 is a conditional raw water tank separated into four tanks 14–17 by the partition wall 11, 12, 13, and the neighboring tanks are communicated by communication hole 18–20 each other. To the first tank 14, the overflow system 21 to return the raw water to the raw water tank 1 not to surpass the predetermined height in case the liquid level exceeded the height is provided.

30 is a chemicals supply apparatus providing with a S-agent tank 31 storing the chemicals (written as S-agent hereinafter) forming flocs by precipitating the heavy metals within the raw water as the sulfide and a FC-agent tank 32 storing the chemicals (written as FC-agent hereinafter) activating the generation and adherence of the air bubbles, the S-agent is added to the second tank 15 by the pump 33, and the FC-agent is added to the third tank 16 by the pump 34. The adding order of the S-agent and the FC-agent may be inverted or may be added simultaneously.

22 is a pump stirring the raw water A and the added S-agent at the second tank 15, 23 is a pipe whereto a pump 22 is provided, 24 is a flow rate control valve, 25 is a pump stirring to mix the FC-agent added at the third tank 16, 26 is a pipe whereto a pump 25 is provided, 27 is a flow rate control valve.

40 is a first flotation tank, 50 and 60 are the second flotation tanks, 41, 51 and 61 are the partition plates, 42, 52 and 62 are the floating tanks, 43, 53 and 63 are the separating tanks, 44, 54 and 64 are the scum outlet port to discharge the scum separated at the separating tank 43, 53 and 63, 45, 55 and 65 are the skimmers to scrape the floated scum to the scum outlet port 44, 54 and 64, 46, 56 and 66 are the scum dehydration tank to separate the liquid from the scum by the filtering sheet 47, 57 and 67 after receiving the scum discharged from the scum outlet port 44, 54 and 64, 48, 58 and 68 are the pipes introducing the liquid separated by the scum dehydration tank 46, 56 and 66 to the raw water tank 1. 70 is a pipe introducing the liquid within the fourth tank 17 of the conditional raw water tank 10 to the lower part of the floating tank 42 of the first flotation tank 40, 71 is a pipe introducing the residual water whereof scum separated from the lower part of the separating tank 43 of the first flotation tank 40 to the lower part of the floating tank 52 of the second flotation tank 50, 72 is a pipe introducing the residual water whereof the scum separated from the lower part of the separating tank 53 of the second flotation tank 50 to the lower part of the floating tank 62 of the second flotation tank 60, 73, 74 and 75 are the pumps equipped to the pipe 70, 71 and 72, 76, 77 and 78 are the circulating pipe to flow back again the liquid pumped up by the pump 73, 74 and 75 to the pump 73, 74 and 75, 80, 82 and 84 are the flow rate control valves.

90 is an air pump acting as an air supply apparatus, feeding air through the control valves 91, 92 and 93 to the pipes 70, 71 and 72 settled just before the upper side of the pump 73, 74 and 75. 94, 95 and 96 are the return pipes communicating each lower part of the floating tank 42 and that of the fourth tank 17, the lower part of the floating tank 52 and that of the separating tank 43, and the lower part of the floating tank 62 and that of the separating tank 53, they have the role of keeping the liquid level of the fourth tank 17, the first flotation tank 40 and the second flotation tank 50 and 60 in constant by flowing them back in case the pumping power of the pump 73, 74 and 75 loses the balance.

100 is a discharge tank storing and discharging the treated water from the lower part of the separating tank 63 of the last step of the second flotation tank 60, being able to regulate the liquid level of the second flotation tank 60 (also that of the fourth tank 17, the first flotation tank 40 and the second flotation tank 50) by the level regulator 101.

The operation of the above mentioned device will be described by giving the example of the treatment of the photographic development waste water.

First, the raw water A within the raw water tank 1 is pumped up by the pump 2 to the first tank 14 of the conditional raw water tank 10. Together with this pumping is controlled by the water level sensing element 5, the first tank 14 is directed not to be stored more than a predetermined height by the overflow system 21. The raw water stored at the first tank 14 is transferred to the second tank 15 through the communicating hole 18, at the second tank 15, the S-agent from the S-agent tank 31 is added and stirred by the pump 22. It is important that this S-agent possesses the special characteristic easily adhere the produced compounds to the air bubbles. In case the silvers are dissolved in the sodium thiosulfate as the complex salt such as the photographic development waste water for example, adding the sodium hydrosulfide (NaSH) as one example, the silver sulfide are precipitated. The raw water whereof the silver sulfide is precipitated into flocs are introduced to the third tank 16 through the communicating hole 19. At this third tank 16 FC-agent is added from the FC-agent tank 32 and stirred by the pump 25. This FC-agent is the chemicals which accelerates the generation of the air bubbles and easily catches the flocs by these air bubbles. And, the additional order of the S-agent and the FC-agent can be inverted or simultaneously done according to the case. Thus conditional raw water is sent by the pump 73 to the lower part of the floating tank 42 of the first flotation tank 40 through the pipe 70 and feeded the air from the air pump 90 at just before this pump 73, stirred by the pump 73, the minute air bubbles generate and flocs are beginning to adhere to the air bubbles. The intermixing of the minute air bubbles by this mix-stirring of the air are accelerated further by the circulating pipe 76 and they become to the bubbles scum having caught the flocs with bubbles and easy to float while reaching at the floating tank 42. Accordingly as soon as the bubbles scum reach the bottom of the floating tank 42, they begin to float, the bubbles scum B are washed away on the surface of the separating tank 43 to be pressed and over-densifyed and swept away by the skimmer 45 from the scum outlet port 44 to the scum dehydration tank 46. The scums dehydrated in the scum dehydration tank 46 are stored and the liquid is introduced to the raw water tank 1 through the pipe 48.

As above, the residual water whereof scums are floated and separated are introduced to the second flotation tank 50 from lower part of the separating tank 43 through the pipe 71. While this process, samely the feeding of air, the mixing and stirring by the pump 74 and the circulating by the circulating pipe 74 are give. Being the sulfide, flocs are difficult to be destroyed and it hardly needs to add more again the S-agent and FC-agent because this mixing and stirring make them easy to adhere to the air bubbles. And with the same process, the scums are floated and separated at the second flotation tank 50, the residual liquid float and separate the scums at further rear step of the second flotation tank 60. The treated water whereof scums are floated and separated through many steps are drained to outside from the lower part of the separating tank 63 of the second flotation tank 60 through the discharge tank 100. And the silvers are recovered as the silver sulfide from the scum dehydration tank 46, 56 and 66.

In addition, the number of the flotation tank is determined freely by the density of the sort of impurity in the raw water.

The liquid level of the flotation tank 40, 50 and 60 is regulated by the level regulator 101 of the discharge tank 100. That is, setting the level of the level regulator 101, the liquid level of each tank is regulated to that setting level because the second flotation tank 60 and 50, the first flotation tank 40 and the conditional tank 10 are communicated by the flow-back pipes 96, 95 and 94. And the open degree of the flow rate control valves 80, 82 and 84 are regulated by the power of each pump. In addition, the present device can be applied to separate not only silver but also other heavy metals and other solids.

EXAMPLE

Table 1 shows an example of the result using the present invention for the photographic development waste water.

TABLE 1

|  | quantity | grade | content | Ag distribution rate |
|---|---|---|---|---|
| raw waste water | 100 Kg | 605 mg/l | 605 g | 100% |
| scum | 0.765 Kg | 78.5% | 590 g | 97.5% |
| treated water | 999.2 Kg | 15 mg/l | 15 g | 2.5% |

As above, we can get a remarkable result of 78.5% of Ag grade within the scum, 97.5% of recovery rate.

The present invention is composed as mentioned above, the precipitated the heavy metals within the raw water as the chemical compounds that is easy to adhere to the air bubbles, so that, different from the flocs of aluminum hydroxide at the general raw water treatment, it never loses the flotationity however stirred by such as pumps. And even if the chemicals are not added at other than the first step, if only air mixing and stirring are given, the air bubbles generate sufficiently by means of the FC-agent remained within the liquid and thereto flocs adhere, which enable to floatate efficiently.

Thus, as the heavy metals within the raw water liquid are separated in high efficiency as the high grade scum that it makes possible to downsize the device and to separate and recover in low cost.

Having thus described the present invention by way of a typical practical embodiment thereof, what is claimed as new is as follows:

1. An apparatus for the separation of a heavy metal from water containing said heavy metal, comprising means for providing an alternative to chemical precipation, electroplating and hydroxide flocculation, and for improving the separation of said heavy metal from said water, said means including in combination:

means defining a flow of said water, including a conditioning tank having a first upstream chamber and a second chamber downstream from said first chamber;

means connected to said flow defining means for supplying sulfide to at least one of said first and second chambers;

means connected to said flow defining means for supplying a floc-separating material to at least the other of said second and first chambers; said material being capable of associating with precipitant formed from said sulfide and said heavy metal so as to form a floc separable by air flotation from said water;

means connected to said flow defining means downstream of said second chamber for supplying air to said water;

means connected to said flow defining means immediately downstream of said air supplying means for pumping said water and said supplied air; and floc-separating means connected to said flow defining means downstream of said pump.

2. The invention according to claim 1, wherein said flow defining means comprises means for enabling preclusion of scum paddles and scum removal troughs from said conditioning tank and through said pumping means.

3. The invention according to claim 1, wherein said sulfide supplying means supplies sulfide to only said first chamber.

4. The invention according to claim 1, wherein said supplied sulfide is sodium hydrosulfide.

5. The invention according to claim 1, wherein said supplied floc-separating material is a flocculant.

6. The invention according to claim 1, wherein said said supplied floc-separating material is a foaming agent.

7. The invention according to claim 1, wherein said first and second chambers include means for mixing said supplied sulfide and floc-separating material, respectively, with said water.

8. The invention according to claim 1, wherein said floc-separating means comprises at least one flotation tank.

9. The invention according to claim 8, wherein said floc-separating means comprises three flotation tanks fluidly connected in series.

10. The invention according to claim 9, further comprising a flow-back pipe fluidly connecting each flotation tank to the tank immediately upstream of said each flotation tank.

11. A method of separating a heavy metal from water containing said heavy metal, comprising: providing an alternative to chemical precipitation, electroplating and hydroxide flocculation, and improving the separation of said heavy metal from said water, by disposing said water in a means for defining a flow of said water;

supplying sulfide and a floc-separating material to said water in said flow defining means, said floc-separating material being capable of associating with precipitant formed from said sulfide and said heavy metal so as to form a floc separable by air flotation from said water;

thereafter supplying air to said water in said flow defining means;

pumping said water and supplied air in said flow-defining means to a floc-separating means; and separating from said water a floc formed by said sulfide, said floc-separating material, and said air, in said floc-separating means.

12. The invention according to claim 11, comprising the simultaneous step of precluding separation of said floc prior to said separating step.

13. The invention according to claim 11, wherein said sulfide is sodium hydrosulfide.

14. The invention according to claim 11, wherein said floc-separating material is a flocculant.

15. The invention according to claim 11, wherein said floc-separating material is a foaming agent.

16. The invention according to claim 11, comprising the step of mixing said supplied sulfide and said floc-separating material with said water.

17. The invention according to claim 11, wherein said sulfide and said floc-separating material are sequentially supplied to said water.

18. The invention according to claim 11, wherein said floc-separating step is carried out by air flotation.

19. The invention according to claim 18, wherein said air flotation step is carried out employing three air flotation tanks fluidly connected in series.

* * * * *